UNITED STATES PATENT OFFICE.

LEONHARD SCHRATT, OF CINCINNATI, OHIO.

PROCESS OF MAKING FLUID FOR COLORING STONE.

1,158,730.

Specification of Letters Patent.

Patented Nov. 2, 1915.

No Drawing.  Application filed January 22, 1912. Serial No. 672,719.

*To all whom it may concern:*

Be it known that I, LEONHARD SCHRATT, a subject of the Emperor of Germany, and resident of Cincinnati, county of Hamilton, and State of Ohio, have invented certain new and useful Improvements in Processes of Making Fluid for Coloring Stone, of which the following is a specification.

This invention relates to the coloration of stone and similar materials and has for an object to produce a fluid which is capable of acting as a vehicle for various coloring materials and of permeating the pores or interstices of a stone or stone-like material and of carrying the coloring matter with it.

A further object is to produce a fluid vehicle for coloring materials which will quickly penetrate below the surface of a stone or similar material when it is placed on the surface and will carry a coloring material with it into the stone.

A further object is to produce a method of manufacturing a fluid which is capable of acting as a vehicle for coloring material and for causing the coloring material to penetrate the surface of marble and other rock formations.

In carrying out the process which forms a part of my invention a material such as tar, is mixed with magnesium or a metal of the magnesium group, an acid such as salicylic acid, salts, such as soda, a compound of sulfur such as chlorid of sulfur, and alcohol. Water is then added to the mixture and it is subjected to heat until it is brought to the boiling point. The residue may then be removed by filtration and a coloring agent added to the filtrate, which is capable of penetrating the surface of the stone and permeating its pores or interstices and of carrying the color with it. The fluid so produced is not only capable of quickly penetrating the surface of such formations as granite, rock or marble, but it also appears to add permanence to the coloring and distributes it approximately uniformly throughout the penetrated portions of the stone. In coloring porous stones, such as sandstone, before applying the coloring solution I have found it advisable to apply to the stone some of the residue which is left upon the cloth after the filtering process above described. The function performed by the magnesium is that of preventing the coloring material from running or spreading into adjacent colors. This function is necessary particularly with soft and porous stones.

I have found by experiment that the following substances mixed together in the proportions indicated produce a fluid which gives excellent results. 2 ounces of tar, $\frac{1}{2}$ ounce of salicylic acid, $\frac{1}{4}$ ounce of magnesium, $\frac{1}{2}$ ounce of sodium bicarbonate, $\frac{1}{2}$ ounce of sodium carbonate, $\frac{1}{2}$ ounce of wood alcohol, $\frac{1}{10}$ ounce of commercial chlorid of sulfur.

This mixture is brought to a boil in 5 ounces of water and then filtered for the purpose of removing the residue. The filtrate may then be employed as the vehicle for different coloring materials.

I have found by experiment that this fluid is capable of carrying a number of different coloring materials and consequently of imparting different colors to marble, granite and similar rock formations. The chlorid of sulfur gives greater permanence to the colors. I have found it particularly effective in retaining the freshness of green coloring materials. The sodium bicarbonate seems to refine the tar, so that when it is used it preserves the brilliancy of certain colors, particularly red, which will not turn to a yellow tinge, when the sodium bicarbonate has been used in the preparation of the substance. The function performed by sodium carbonate is that of preventing the fluid from entering into the stone too rapidly. It retards this action so that the colors may be absorbed more thoroughly by the stone. In coloring hard stones, such as marble, the following steps are taken;

The fluid carrying the coloring material is placed upon the surface of the stone and allowed to penetrate to the desired depth. This gives a uniform and permanent color to the surface of the stone and it may be polished or cut without affecting the color. I have also found that the fluid will penetrate and carry the coloring matter with it, into the polished surface of some marble and similar stones.

What I claim is:

A process of making fluid for coloring stone, consisting in mixing tar, salicylic acid, sodium carbonate, sodium bi-carbonate, chlorid of sulfur, magnesium, and alcohol together, substantially in the proportions described, subjecting the mixture to heat, filtering off the residue, and adding a pigment.

LEONHARD SCHRATT.

Witnesses:
W. THORNTON BOGERT,
J. H. GRUETER.